(12) United States Patent
Vedy et al.

(10) Patent No.: US 8,772,988 B2
(45) Date of Patent: Jul. 8, 2014

(54) STATOR STRUCTURE FOR ELECTRIC MACHINE

(75) Inventors: Bertrand Vedy, La Tour de Peilz (CH); Frederic Progin, Arconciel (CH)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 546 days.

(21) Appl. No.: 13/061,791

(22) PCT Filed: Sep. 2, 2009

(86) PCT No.: PCT/EP2009/061337
§ 371 (c)(1),
(2), (4) Date: Jun. 10, 2011

(87) PCT Pub. No.: WO2010/026158
PCT Pub. Date: Mar. 11, 2010

(65) Prior Publication Data
US 2011/0227428 A1    Sep. 22, 2011

(30) Foreign Application Priority Data

Sep. 3, 2008  (FR) ...................................... 08 55898

(51) Int. Cl.
*H02K 1/04* (2006.01)
*H02K 5/00* (2006.01)
(52) U.S. Cl.
USPC .................................. 310/43; 310/89; 310/91
(58) Field of Classification Search
USPC ........................................ 310/43, 260, 89, 91
See application file for complete search history.

(56) References Cited

U.S. PATENT DOCUMENTS

| | | | |
|---|---|---|---|
| 3,267,399 A | 8/1966 | Spieker et al. | |
| 3,939,372 A | 2/1976 | Wurst et al. | 310/168 |
| 4,908,347 A * | 3/1990 | Denk | 505/166 |
| 4,950,438 A * | 8/1990 | Nakamura et al. | 264/272.2 |
| 5,142,182 A | 8/1992 | Grant | 310/270 |
| 5,554,900 A | 9/1996 | Pop, Sr. | 310/156 |
| 5,767,596 A | 6/1998 | Stark et al. | 310/89 |

(Continued)

FOREIGN PATENT DOCUMENTS

| | | |
|---|---|---|
| DE | 1 488 023 A1 | 5/1969 |
| DE | 1 613 298 A1 | 12/1970 |

(Continued)

*Primary Examiner* — Tran Nguyen
*Assistant Examiner* — Leda Pham
(74) *Attorney, Agent, or Firm* — Fitzpatrick, Cella, Harper & Scinto

(57) ABSTRACT

An electric machine includes a stator stack of laminations, pierced with a cylindrical passage for housing a rotatable rotor therein. The stator includes a magnetic circuit of laminations stacked between first and second terminal faces crossed by the passage and by a series of slots housing conductors, which are folded over to form coils. An electrically insulating reinforcing wedge piece is interposed between an internal wall of a first tubular end and a corresponding portion of a block of resin surrounding a region of winding heads of the conductors, which follow a looped path in the block of resin. A wedging unit wedges the insulating reinforcing piece in position to prevent the insulating reinforcing piece from protruding axially internally on the internal wall with respect to the region so as to leave a determined annular sector of the internal wall in direct adhering contact with the block of resin.

7 Claims, 2 Drawing Sheets

(56) References Cited

U.S. PATENT DOCUMENTS

| | | |
|---|---|---|
| 5,936,397 A | 8/1999 | Benkert et al. ............... 324/173 |
| 6,646,571 B1 | 11/2003 | Soar et al. ..................... 341/13 |
| 6,657,356 B2 * | 12/2003 | Laurent et al. ......... 310/216.004 |
| 6,943,479 B2 * | 9/2005 | Laurent et al. ............... 310/412 |
| 7,911,095 B2 | 3/2011 | Shu et al. ..................... 310/74 |
| 2002/0175574 A1 | 11/2002 | Okazaki et al. ............. 310/68 B |
| 2004/0090132 A1 | 5/2004 | Utsumi et al. .............. 310/68 B |
| 2004/0232873 A1 | 11/2004 | Heizmann et al. ............ 318/653 |
| 2005/0206253 A1 | 9/2005 | Hertz et al. ................ 310/68 B |
| 2006/0125439 A1 | 6/2006 | Ajima et al. ................. 318/716 |
| 2006/0226719 A1 | 10/2006 | Nakanishi et al. ............. 310/68 |
| 2007/0137373 A1 | 6/2007 | Hoefer et al. ............. 74/490.04 |
| 2007/0205679 A1 | 9/2007 | Terauchi et al. ................ 310/71 |
| 2007/0210661 A1 | 9/2007 | Schmidt et al. ................ 310/90 |
| 2007/0241625 A1 | 10/2007 | Terauchi .................... 310/68 B |
| 2007/0278875 A1 | 12/2007 | Haga et al. ..................... 310/71 |
| 2008/0005888 A1 * | 1/2008 | Bourqui et al. ................. 29/596 |
| 2009/0052209 A1 | 2/2009 | Kaitani et al. .................. 363/37 |

FOREIGN PATENT DOCUMENTS

| | | |
|---|---|---|
| DE | 195 46 595 A1 | 6/1997 |
| DE | 102 26 974 A1 | 1/2004 |
| DE | 103 15 754 A1 | 10/2004 |
| DE | 10 2004 038 877 A1 | 1/2006 |
| EP | 0 874 444 A1 | 10/1998 |
| EP | 1 174 988 A1 | 1/2002 |
| EP | 1 367 698 A2 | 12/2003 |
| EP | 1 793 475 A1 | 6/2007 |
| EP | 1 796 257 A1 | 6/2007 |
| EP | 1 901 416 A2 | 3/2008 |
| GB | 2 438 411 A | 11/2007 |
| JP | 58-224546 A | 12/1983 |
| JP | 60-096147 A | 5/1985 |
| JP | 2005-318745 A | 11/2005 |
| WO | WO 03/001216 A1 | 1/2003 |
| WO | WO 2005/107042 A1 | 11/2005 |

\* cited by examiner

STATOR STRUCTURE FOR ELECTRIC MACHINE

FIELD OF THE INVENTION

The present invention relates to rotary electric machines. It is aimed especially at machines capable of developing high power in a very compact format, notably when they are operating as a motor, for example for traction applications on board motor vehicles.

RELATED ART

It is known that electric vehicle proposals have multiplied lately. The last few years have witnessed the arrival, for propulsion purposes, of electric motors with a specific power of as much, for example, as 20 or even 30 kW in a space compatible with the size of the inside of a vehicle wheel or the immediate surroundings thereof, in the case of a vehicle comprising one electrical machine per driven wheel. Bearing in mind the significant power developed by these machines in a very small space, special measures need to be taken in order to combat the sometimes severe conditions imposed by their operation. This includes, for example, the need for an effective way of removing the heat energy produced in confined spaces or the ability to withstand the very high torques applied between the rotor and the stator of these machines, the component parts of which have to be designed and organized accordingly.

According to one method of construction which is known from the prior art, for example from patent document U.S. Pat. No. 4,908,347, the stator is housed in a casing ("sleeve") such that the terminal parts thereof extend axially toward the outside beyond the ends of the stator magnetic circuit that constitutes the active part of the stator. Windings are housed in the slots. On leaving the slots at each axial end of the block of pole pieces, the conductors of these windings are bent over to form loops in order to pass from one slot to the next, thus forming winding heads which are housed in the respective terminal parts of a casing sleeve. Each terminal part of the sleeve is closed by a cover which completes the casing of the machine. In the centre of each cover is fixed a bushing which supports a bearing in which a respective end of the rotor rotation shaft of this machine is engaged.

When an electromagnetic torque is created in the air gap between the rotor and the stator, either by the application of an electrical current, if the machine is operating as a motor, or by reaction to a mechanical torque applied to the rotor shaft, when operating as a generator, the corresponding forces are transmitted between the stator and the casing, on the one hand, and between the casing and the frame or support of the electric machine, on the other. These forces have to be compensated by corresponding reaction torques. The reliability of the mutual attachment of the various functional pieces of the stator, notably of the block of magnetic pieces to the casing, sometimes presents the designer of machines that develop a high power in a small volume with problems, given the magnitude of the forces involved.

Document EP 1 174 988 filed by a company related to the applicants describes another embodiment of a rotary electrical machine with high specific power, in which the type of difficulty mentioned is likely to arise. The machine comprises a stator, a rotor mounted to rotate inside the stator and a casing enclosing the whole. The stator comprises a magnetic circuit that includes a laminated block of laminations stacked between a first and a second axial terminal face. Through it there passes a cylindrical passage in which the rotor is mounted with an air gap for separating the opposing lateral surfaces of the said stator and rotor. The stator also has passing through it a series of slots which run from one terminal face to the other, and house conductors bent over as they leave each terminal face to pass from one slot to the next in order to form coils. The bent-over portions of the conductors in the terminal faces are gathered into winding heads potted in a block of insulating and bonding resin.

In that document, the magnetic circuit is formed in two parts. First of all, it comprises a pile or stack of stator laminations known as star laminations defining radial teeth separated by openings which define the slots of the magnetic circuit. Next, the pile of star laminations is housed in and fixed inside a cylindrical field frame formed by a second pile of pieces or laminations in the form of circular rings. The field frame ensures the magnetic continuity between the ends of the teeth of the star laminations of the first pile by closing the slots on the external radial side. On the opposite radial side, the conductors in the closed ends of said slots are located in close proximity to the air gap, as set out in detail in the document mentioned. Finally, the stack of field frame pieces is housed in and blocked against rotation inside a casing the axial ends of which each comprise an end plate supporting a rolling bearing of the rotor, and which are closed at each end by a cover.

During manufacture, the stator is mounted in the casing and the laminations and the windings are potted in resin which provides electrical insulation or even over insulation for the functional parts with respect to one another, notably the laminations and all the conductors. The potting resin also contributes to the mutual cohesion of the laminations and to the assembly of the two stacks of laminations with one another. It contributes towards the quality of the exchange of heat with the cooling system. It holds the conductors in position in their slots and coats the winding heads as they leave the terminal faces of the stack of so-called star laminations, in blocks of resin.

However, during the testing of certain powerful machines, the applicants noted instances in which the structure of the stator had sustained damage. Upon analysis it was found that certain pieces which are normally blocked against rotating relative to one another had become detached under the effect of the intensity of the torque applied in the air gap and under the effect of the temperature which caused differential expansion of the various constituent parts of the stator. Thus, the difficulties already mentioned can also be encountered in the case of stator magnetic circuit structures that are produced in two parts with a view to making it possible to achieve optimum filling of the slots with conductors.

It might be thought that the quality of the anchorage of the stator, notably in the case of a two-part magnetic circuit construction, could be improved by using the block of resin that envelops the winding heads to form a mechanical bridge between the end face of the axial terminal part of the magnetic circuit, at least on one side, and the internal tubular wall of the sleeve on this same side. Solutions of this type have been described, for example, in patent document EP 1367698 in which the winding heads originating out of each face of the magnetic circuit are coated with a block of resin which is in thermal conduction and adhesion contact with the wall of a tubular part of the casing on each side of the magnetic circuit. Grooves cut in this wall improve the placement of the resin during potting and heat conduction.

In patent document EP 0874444 an electric machine stator is inserted in the casing. Slots positioned facing one another in the cylindrical walls of these two components form axially elongate housings which become filled with resin in order both to anchor these two components against rotational force and ensure good conduction of heat. Inlet openings allow the resin to be conveyed from the axial ends of the whole as far as the said housings at the interface between the contacting cylindrical walls. The system is able to improve the adhesion between the parts of the stator and the casing thanks to the creation of imbricated reliefs which have a tendency to improve the contact between the potting resin and the parts that are to be cooled.

However, the applicant noticed that, bearing in mind the very high stresses, vibrations, loadings and heating to which machines of the abovementioned type are subjected, it was important to maintain the insulation of the conductors of the stator coils at a very high level. Such is notably the case for the conductors in the winding heads potted in the blocks of resin, and this can be inconsistent with an objective of imbricating the block of resin very closely with the walls of parts of the machine. There is therefore a need to find a solution which forms a compromise between these opposing objectives.

SUMMARY OF THE INVENTION

Thus, the present invention is aimed at an electric machine structure with stator windings that overcomes the aforementioned difficulties with electrical machines that are both very compact and very powerful, for numerous industrial applications, particularly in the automotive field.

To this end, an embodiment of the invention is an electric machine structure comprising a stator, a rotor that rotates about an axis with an air gap between the rotor and the stator and a casing enclosing this assembly in whole, in which structure the stator comprises a stator magnetic circuit having a first and a second terminal part each bounded by an end face and crossed, between the said end faces, firstly by a cylindrical passage to house the rotor and, second, by a series of slots which house conductors, bent over as they leave each end face to pass from one slot to the next thereby forming a winding head. The casing comprises a sleeve ending in a first and a second tubular end, inside which sleeve the magnetic circuit is fixed between the said ends to form an entity able to withstand the magnetic torques generated in the air gap during operation, and at least one of the winding heads is coated, in continuity with the pieces of the magnetic circuit, in a block of potting resin which extends radially on the outside as far as the corresponding tubular end wall.

According to an embodiment of the invention, this structure comprises a thin and flexible electrical insulating reinforcing piece which is interposed between the internal wall of the first tubular end and a portion of the corresponding block of resin surrounding that region of the winding head in which the conductors follow a looped path in the block of resin, and a wedging unit that wedges this insulating reinforcing piece in position to prevent it from protruding axially internally on the internal wall with respect to this region so as to leave a determined annular sector of the said internal wall, between the said end face and the said region, in direct adhering contact with the block of resin.

According to an embodiment, the said wedging unit includes a shoulder at the surface of the internal wall of the said tubular piece that has an annular face facing axially toward the outside and against which an edge of the thin and flexible insulating reinforcing piece butts axially internally. According to a complementary provision, a second shoulder facing in the opposite direction is cut in the said internal wall in order therein to create a superficial groove in which the said strip of material is retained.

Thanks to the wedging unit just described, an arrangement is available that allows optional enhanced insulation of certain sensitive electrical parts of the electrical machine to be combined precisely with improved attachment between stator and casing afforded by the use of a block of resin formed around at least one of the winding heads in order to create a mechanical link between an end face of the magnetic block of the stator and the internal wall of the casing. In practical terms, the narrow groove formed toward the axial end of the casing sleeve allows an insulating strip, made of Kapton® for example, to be positioned accurately in an axial position around the winding head which corresponds to a region in which the radial dimension of the loops is the greatest, that is to say in the region where they come closest to the metallic internal wall of the casing. That corresponds to the region in which enhanced electrical insulation is most useful. The wedging therefore makes it possible, with good manufacturing repeatability, to prevent the insulating strip from being able to protrude into the annular sector situated between the said region and the end face of the magnetic circuit from which the winding head originates.

When the machine is being assembled, after potting, this annular sector is in direct adhesion contact with the block of resin surrounding the winding head. The aim is to ensure that the axial dimension of this annular sector is large enough that the additional attachment of the said end face of the magnetic circuit afforded by the block of resin is as effective as possible against rotational torques of magnetic origin created by the operation of the machine.

It will be appreciated that the additional attachment is produced, at least in part, by the connection between the end face of the magnetic circuit and the block of resin formed around the winding head supplemented by the connection of this block of resin to at least one sector of the internal wall of the first tubular end of the sleeve which is suitably configured for this purpose. With the resin, these connections are advantageously achieved by bonding.

According to a preferred complementary embodiment, with a view to enhancing the attachment of the stator, use is made of a setup in which the relevant end face of the magnetic circuit is blocked axially toward the outside by a shoulder in the internal wall of the said tubular end of the casing. The annular sector for adhesion contact of the block of resin then runs axially toward the inside at least as far as the said shoulder but also preferably includes the perpendicular face in abutment against the magnetic circuit. The change in angle of orientation of the faces in contact with each other further improves the adhesion between the two parts.

Again in order further to increase the mutual cohesion of the contacting parts against pull-out torques that may be high, it may be sensible to ensure that the contacting parts of the said block of resin and of the internal wall of the casing have reliefs imbricated in one another and at least partially directed in an axial direction in order to strengthen their anchorage to one another in terms of rotation. In the latter instance, provision may be made for the bonding region or sector to be cut with hollows filled with the block of resin in order to enhance the bonding with respect to the casing sleeve through the mutual imbrication of reliefs belonging to these two elements.

In this respect, when the end face of the first terminal part of the magnetic circuit is blocked axially towards the outside by a shoulder in the internal wall of said tubular end, according to one embodiment, provision is made for the creation of reliefs or slits in series all around the circumference of the edge corner of the said shoulder.

One embodiment of the invention relates to the construction of an electric machine in which the stator magnetic circuit comprises a first stack, or pile, of laminations known as star, star-shaped or star-configured laminations defining radial teeth separated by openings which form the slots of the said magnetic circuit and a second stack of annular pieces in the form of circular rings which define a cylindrical field frame in which the stack of star-configured pieces is mounted under conditions of magnetic continuity. In this case, the attachment according to an embodiment of the invention creates a direct connection between the stack of star laminations and the internal wall of the said tubular first end of the casing. It contributes towards additionally enhancing the rotational blocking of the stack of star laminations against the high rotational torques which are transmitted from the air gap towards the casing of the machine.

Other features and advantages of the invention will emerge from the description given hereinafter with reference to the attached drawings which, by way of nonlimiting examples, show embodiments of the subject matter of the invention.

DESCRIPTION OF EMBODIMENTS OF THE INVENTION

Figure 1:
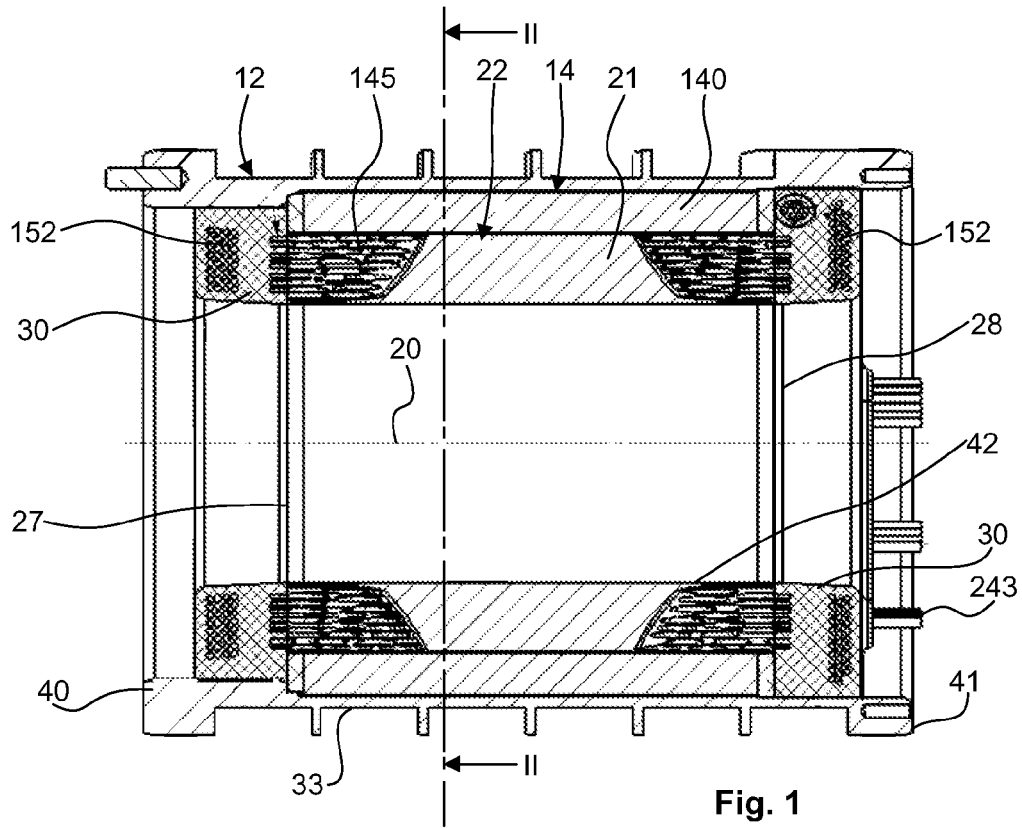
FIG. 1 is a view in cross section, on an axial plane I-I of FIG. 2, of one example of a stator of an electric machine and of an element or sleeve of a casing in which the stator is housed, where an embodiment of the invention is implemented.

A synchronous electric machine 10 depicted, without its rotor, in FIG. 1 comprises an external casing 12 inside which there is housed a stator 14, internally bounded by a cylindrical wall 42. This wall in the conventional way defines one face of a functional air gap the other cylindrical face of which consists of the lateral wall of the rotor mounted to rotate about an axis 20 inside the stator. The stator 14 comprises a stator magnetic circuit 22 which comprises, on the one hand, a stack or pile 21 of star laminations 24, stacked in the axial direction and, on the other hand, a cylindrical field frame 140 (FIG. 2) consisting of a cylindrical pile of laminations in the form of circular rings. The star-shaped laminations 24 have teeth 142 separated by trapezoidal cutouts so as to create in the pile 21 a series of slots 26 which, without being parallel to the axis 20, run through the pile 21 between one of its axial end faces 27 and its other axial end face 28, remaining circumscribed inside a virtual cylindrical ring the internal edge of which is in the immediate vicinity of the internal cylindrical wall 42 of the pile 21.

Figure 2:
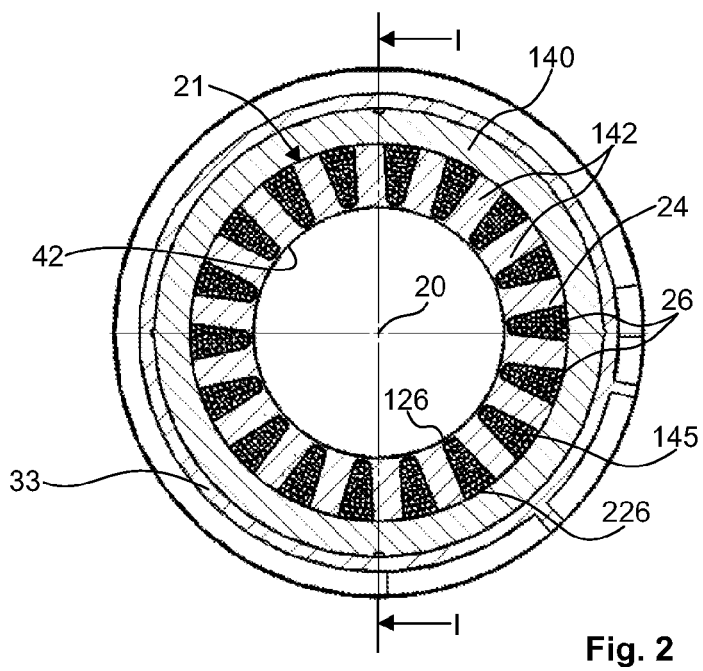
FIG. 2 is a view in section on II-II of FIG. 1 through a subassembly shown in FIG. 1.

The cross-sectioned view in FIG. 2 clearly shows the slots 26 through which the conductors 145 run which widen between an internal radial end 126 near the air gap and their radially external other end 226 where they are closed by the field frame 140 which closes the stator magnetic circuit 22 at the outer radial end of each of the teeth 142 of the star laminations 24. Housed in the slots 26 are copper conductors 145 which are bent over as they leave each slot 26 in the end faces 27 and 28 on each side of the pile 21 to form a loop so that they can enter another slot 26. In this way, the conductors 145 produce three windings or groups of windings which may be electrically connected to a voltage source or a device for using or storing electrical energy. The sets of loops of the winding conductors 145 emerging from the end faces 27 and 28 are gathered together at each end into two respective "winding heads" 152 all around the end of the pile 21. These winding heads are potted in a resin which, during manufacture, penetrates the slots from at least one of the terminal faces and, once it has solidified, forms two terminal blocks 30 on the exit side of the two end faces 27 and 28 (FIG. 1).

The stator 14 is housed in a casing sleeve which notably comprises a bushing 33 (FIGS. 1 and 2). The field frame 140 of the stator magnetic circuit 22 is blocked in terms of rotation in the internal cylindrical space delimited by the wall of the bushing 33. The external radial face of the wall of the bushing 33 is covered with helical grooves 36 which together delimit passages for the circulation of a coolant that cools the stator body. At each axial end, the bushing 33 of the sleeve has an annular end face, 40 on the same side as the splined output end of the rotor shaft, which in this instance is on the left, and 41 at the end from which the conductors 243 that electrically connect the induction coils to the outside of the machine emerge. Each annular end face 40 and 41 has tapped holes in the periphery so that an end plate can be screwed into each of these faces. Each of these end plates in its central part supports a rolling bearing centred on the axis 20 to accept the respective end of a shaft on which the rotor of the machine is mounted. It will be noted that these last details, which are intended to recall the overall organization of this type of electric machine, are not necessary to understanding the construction or structure that forms the subject matter of this description and have not been depicted in the drawing.

Returning now to the latter, the bushing 33 comprises (FIG. 3) a cylindrical internal wall or surface 70 the main central portion of which accepts the external lateral face of the pile of the field frame 140 between two tubular ends 74, which corresponds to the annular end face 40, and 75, on the axial end face 41 side, respectively. The internal diameter of the tubular end 74 is slightly smaller than that of the central wall 72 so that these two wall sections are separated by a shoulder 76 facing towards the end via which the wires 243 are intended to emerge from the stator 14. On the opposite side to this wire outlet end, the pile of rings or laminations of the field frame 140 is terminated by an annular abutment lamination 144. This lamination butts against the shoulder 76 protruding radially beyond the internal side, in the knowledge that the difference between the diameters of the central wall 72 and the tubular end 74 is smaller than the thickness of the pile of the cylindrical field frame 140.

Figure 4:
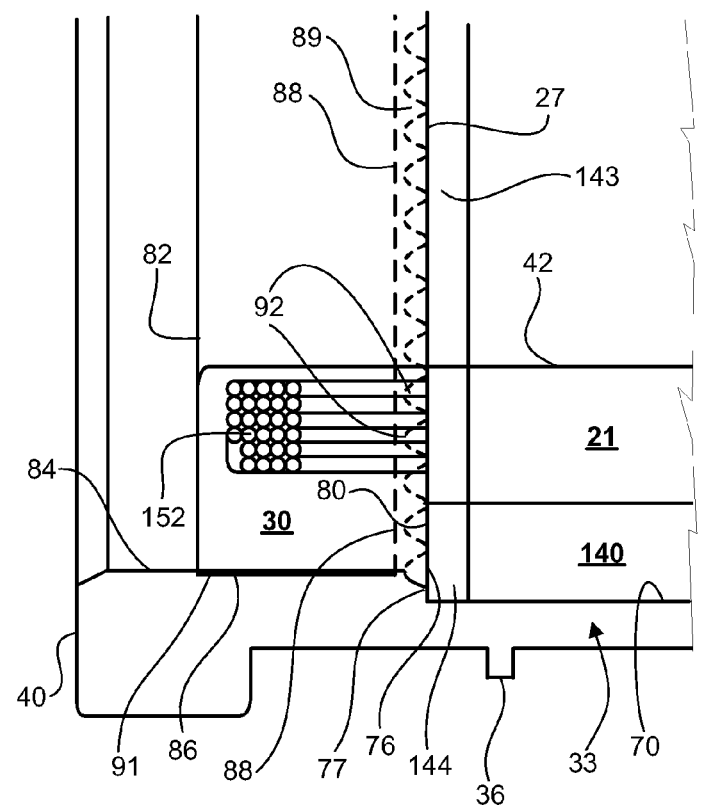
FIG. 4 is a simplified enlarged view of a portion of the stator in the sleeve of the embodiment of FIGS. 1 and 2.

In FIG. 4 it can be seen that the pile 21 of star laminations 24 ends in an end lamination 143 the axial external face of which is situated in the terminal face 27 at the same axial level as the corresponding face 80 of the thrust or abutment lamination 144 which terminates the stack or pile of the field frame 140. The conductors 145 emerge from slot outlets in the face 27 and are gathered together into the winding head 152 inside the tubular end 74 of the bushing 33. They are potted in the block of resin 30 which occupies practically all the cylindrical annular space internal to this tubular end 74 and which, by potting the conductors and the laminations in the slots 26 with resin starting from each of the end faces 27 and 28 is secured to the pile 21.

On the external axial side of the tubular end 74, the block of resin 30 extends as far as the limit 82 of an internal cylindrical bearing surface 84 formed in the internal wall of the bushing 33 at the exit of its annular end face 40. This bearing surface is intended, upon assembly, to accept a centring bushing that centres one of the end plates mentioned above, which is normally screw-fastened against the annular end face 40 of the bushing 33. As mentioned earlier, this end plate, not depicted, bears one of the rolling bearings of a corresponding end of the rotor rotation shaft. The limit 82 also corresponds to the outer edge of a groove 86 with a flat cylindrical bottom, of shallow depth, in the wall 70. The other edge or shoulder 88 of the groove 86 on the internal axial side is spaced away from the edge corner 77 of the shoulder 76 by a distance that corresponds to a fraction of the axial length of the block of resin 30.

Housed in the groove 86 is a sheet of electrical insulator 91 specialized for this type of application in electric machines, such as a film of Kapton® (registered trade name of the company Du Pont de Nemours). The thickness of the sheet 91 corresponds substantially to the depth of the groove 86. The sheet 91 thus lines the internal periphery of the bushing 33 over part of the length of its contact with the block of resin 30 which corresponds to the surrounding of the loops of conductors which make an outward and return passage with respect to the end face 27 of the magnetic circuit between leaving one slot and entering another. However, the sheet of Kapton® 91 does not extend as far as the face 27. It is wedged against the shoulder 88 which forms the edge of the groove 86 and which serves as a wedge that prevents it from protruding into the sector 89 which extends axially between the edge corner 77 of the shoulder 76 and the shoulder 88 of the groove 86. Thus, outside of the sector 89, the sheet of Kapton® 91 further adds a level of insulation between the conductors 145 of the windings in the winding head 152 and the internal metal wall of the body of the bushing 33 in the region where the loops of conductors spread out the most radially coming radially closer to the conducting internal wall of the sleeve or bushing 33 (as can be seen better in FIG. 1 than in the very schematic depiction of FIG. 4). However, because the resin does not adhere to the Kapton®, nor does the Kapton® adhere to the metal (in this case aluminium) from which the body of the bushing 33 is made, according to the invention, a sector 89 is formed which remains free for direct adhesive contact with the block of resin and the internal wall 70 in order to enhance the bond between the magnetic circuit 22 and the internal wall of the bushing 33, and more particularly of the pile 21 with the tubular end of this bushing 33.

Figure 3:
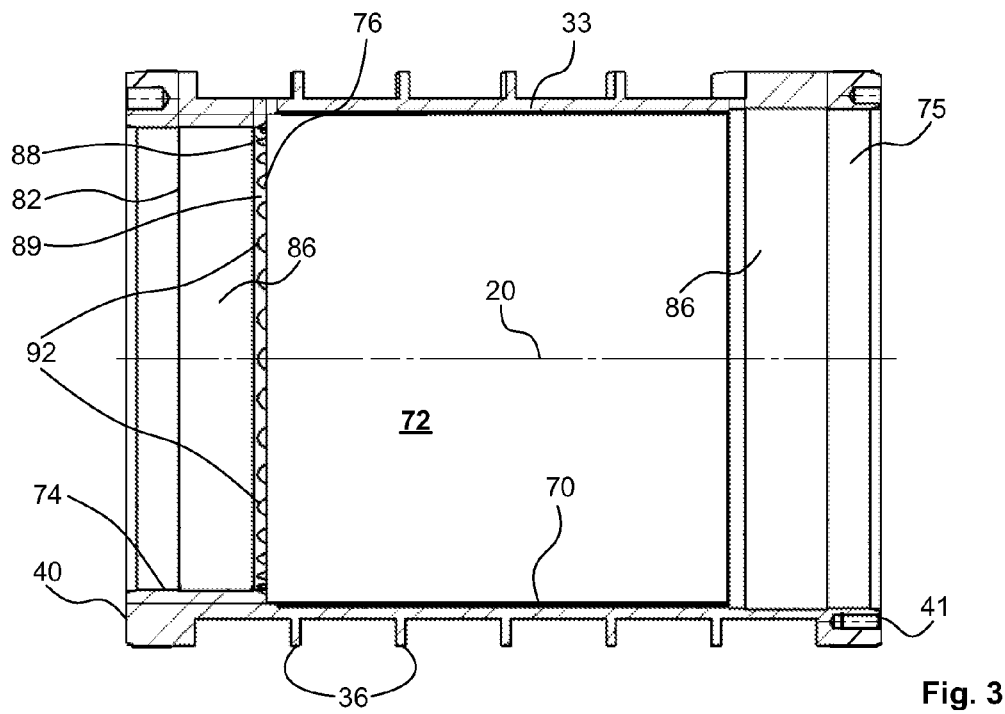
FIG. 3 is a cross section through the sleeve of FIG. 1, illustrating an embodiment detail.

As has been clearly depicted in FIG. 3, in order further to reinforce this connection, the edge corner 77 of the shoulder 76 has slits 92 around its entire periphery and the rounded tops of which terminate in the cylindrical sector 89 of the wall 70. During the machine manufacture, the pile of field frame laminations 140 is introduced into the bushing 33, in the direction extending from the terminal face 28 towards the end face 27, until the face 80 of the field frame abutment lamination 144 comes into abutment against the shoulder 76. Next, the stack 21 of star laminations the slots of which are filled with conductors is introduced into the stack of field frame laminations. A potting operation is then undertaken during which the liquid insulating and bonding resin is introduced into the assembly in the tubular end 74 of the bushing 33 standing upright. The amount of resin is regulated so that following the contraction that results from its cooling, the resin enters all the gaps left free and solidifies forming the block of resin 30.

In particular, the resin fully or in part secures all the laminations of the stack 21 and the laminations of the field frame 140, assembles the stack 21 of star laminations and the laminations of the field frame 140 by bonding and bonds the periphery of the laminations of the field frame 140 to the internal wall or surface 70 of the bushing 33. The resin that makes up the block of resin 30 is in contact with the end faces of the abutment laminations 143 and 144 of the two stacks as far as the cylindrical wall 42 which defines the passage in which the rotor will be housed. The block of resin 30 also fills the annular space externally delimited by the sector 89 of the wall of the bushing. The solidified resin adheres to the aluminium surface of the sector 89 which, it will be recalled, is free of any insulant and notably is not covered by the sheet of Kapton® 91. The resin of the block 30 also fills all the hollows formed by the slits 92 in the shoulder 76. As appropriate, it infiltrates the gaps between the contacting faces of the field frame abutment lamination 144, on the one hand, and the counter-abutment face of the shoulder 76, and the internal wall or surface 70 of the bushing, on the other. The block of resin 30 therefore, in addition to directly bonding to various surfaces, creates a form of fastening using the imbrication of reliefs in order to anchor the stack 21 of star laminations in the bushing 33. Thus, the resistance to rotational torque that is applied during operation between the magnetic circuit 22 and the casing bushing 33 is reinforced.

The solution described here does indeed make it possible to obtain such a reinforcement in cases where the stator comprises a single stator magnetic circuit secured, for example, by bonding to the casing. It can be used to good effect in the instance cited here by way of example in which the stator magnetic circuit is made up of two parts assembled by bonding, this representing one interface more that has to withstand the rotation torques that arise in the air gap. This strengthening is particularly welcome when it is recalled that the separation between a first stack of star laminations and a second stack of field frame laminations that closes the widened opening of the slots in which winding conductors are stacked is effective at achieving optimum filling of the slots with these conductors. This arrangement therefore makes it possible to obtain high specific power which in turn requires particularly firm mutual attachment of the stator components.

Of course, the solution put forward may be applied to each end of the casing sleeve, if appropriate.

In an exemplary embodiment described hereinabove, a stator was built for a synchronous machine with three-phase star connection the overall outside diameter of which was around 110 millimeters, for an air gap diameter of 50 millimeters. The length of the magnetic piles inside the sleeve was about 80 millimeters. The resin blocks 30 had an axial length of around 20 millimeters and the length of the sector of internal wall of the bushing that had no Kapton® insulation measured about 2.5 millimeters with indentations in the edge corner of the shoulder 76. This then yielded a 30 kilowatt machine capable of developing torques of 35 nm with no failure observed during testing.

The invention is not restricted to the examples and embodiments described and depicted hereinabove; various modifications can be made thereto without departing from its scope as defined by the attached claims.

The invention claimed is:

1. An electric machine structure comprising:
 a stator;
 a rotor that rotates about an axis such that an air gap is present between the rotor and the stator;
 a casing enclosing the stator and the rotor;
 a thin and flexible electrically insulating reinforcing piece; and
 a wedge,
 wherein the stator includes a magnetic circuit having first and second terminal parts bounded by end faces and crossed, between the end faces, by a cylindrical passage to house the rotor and by a series of slots that accommodate conductors, the conductors being bent over at the end faces to pass from one of the slots to a next one of the slots to thereby form loops of a winding head, wherein the casing includes a sleeve with first and second tubular ends, the magnetic circuit being fixed inside the sleeve between the first and second tubular ends such that the magnetic circuit is able to withstand magnetic torques generated in the air gap during operation, wherein at least one loop of the winding head is coated, in continuity with pieces of the magnetic circuit, in a block of potting resin, which extends radially outside as far as a corresponding tubular end wall, wherein the reinforcing piece is interposed between an internal wall of the first tubular end and a portion of the block of potting resin originating out of the end face of the first terminal part surrounding a region of the winding head in which the conductors follow a looped path in the block of potting resin, and wherein the wedge wedges the reinforcing piece in position to prevent the reinforcing piece from protruding axially internally on the internal wall with respect to the region of the winding head so as to leave a determined annular sector of the internal wall in direct adhering contact with the block of potting resin.

2. An electric machine structure according to claim 1, wherein the wedge includes a shoulder at a surface of the internal wall of the first tubular end, the shoulder having an annular face facing axially toward an outside region and against which an edge of the reinforcing piece abuts axially internally.

3. An electric machine structure according to claim 2, wherein the reinforcing piece is a strip of material that is mounted in a narrow groove formed in the internal wall of the first tubular end, between the shoulder of the wedge and a second shoulder facing in an opposite direction.

4. An electric machine structure according to claim 1, wherein the end face of the first terminal part of the magnetic circuit is blocked axially toward an outside region by a shoulder in the internal wall of the first tubular end, and wherein the annular sector extends axially toward an internal region at least as far as the shoulder and as a face that abuts against the magnetic circuit.

5. An electric machine structure comprising:
a stator;
a rotor that rotates about an axis such that an air gap is present between the rotor and the stator;
a casing enclosing the stator and the rotor;
a thin and flexible electrically insulating reinforcing piece; and
a wedge,
wherein the stator includes a magnetic circuit having first and second terminal parts bounded by end faces and crossed, between the end faces, by a cylindrical passage to house the rotor and by a series of slots that accommodate conductors, the conductors being bent over at the end faces to pass from one of the slots to a next one of the slots to thereby form loops of a winding head,
wherein the casing includes a sleeve with first and second tubular ends, the magnetic circuit being fixed inside the sleeve between the first and second tubular ends such that the magnetic circuit is able to withstand magnetic torques generated in the air gap during operation,
wherein at least one loop of the winding head is coated, in continuity with pieces of the magnetic circuit, in a block of potting resin, which extends radially outside as far as a corresponding tubular end wall,
wherein the reinforcing piece is interposed between an internal wall of the first tubular end and a portion of the block of potting resin originating out of the end face of the first terminal part surrounding a region of the winding head in which the conductors follow a looped path in the block of potting resin,
wherein the wedge wedges the reinforcing piece in position to prevent the reinforcing piece from protruding axially internally on the internal wall with respect to the region of the winding head so as to leave a determined annular sector of the internal wall in direct adhering contact with the block of potting resin, and
wherein contacting parts of the block of potting resin and the annular sector have reliefs imbricated in one another and at least partially directed in an axial direction in order to strengthen anchorage of the contacting parts to one another in terms of rotation.

6. An electric machine structure comprising:
a stator;
a rotor that rotates about an axis such that an air gap is present between the rotor and the stator;
a casing enclosing the stator and the rotor;
a thin and flexible electrically insulating reinforcing piece; and
a wedge,
wherein the stator includes a magnetic circuit having first and second terminal parts bounded by end faces and crossed, between the end faces, by a cylindrical passage to house the rotor and by a series of slots that accommodate conductors, the conductors being bent over at the end faces to pass from one of the slots to a next one of the slots to thereby form loops of a winding head,
wherein the casing includes a sleeve with first and second tubular ends, the magnetic circuit being fixed inside the sleeve between the first and second tubular ends such that the magnetic circuit is able to withstand magnetic torques generated in the air gap during operation,
wherein at least one loop of the winding head is coated, in continuity with pieces of the magnetic circuit, in a block of potting resin, which extends radially outside as far as a corresponding tubular end wall,
wherein the reinforcing piece is interposed between an internal wall of the first tubular end and a portion of the block of potting resin originating out of the end face of the first terminal part surrounding a region of the winding head in which the conductors follow a looped path in the block of potting resin,
wherein the wedge wedges the reinforcing piece in position to prevent the reinforcing piece from protruding axially internally on the internal wall with respect to the region of the winding head so as to leave a determined annular sector of the internal wall in direct adhering contact with the block of potting resin, and
wherein the end face of the first terminal part of the magnetic circuit is blocked axially towards an outside region by a shoulder in the internal wall of the first tubular end, an edge corner of the shoulder being provided with reliefs or slits in a series along a circumference thereof and which are imbricated with corresponding slits or reliefs in the block of potting resin.

7. An electric machine structure comprising:
a stator;
a rotor that rotates about an axis such that an air gap is present between the rotor and the stator;
a casing enclosing the stator and the rotor;
a thin and flexible electrically insulating reinforcing piece; and a wedge, wherein the stator includes a magnetic circuit having first and second terminal parts bounded by end faces and crossed, between the end faces, by a cylindrical passage to house the rotor and by a series of slots that accommodate conductors, the conductors being bent over at the end faces to pass from one of the slots to a next one of the slots to thereby form loops of a winding head, wherein the casing includes a sleeve with first and second tubular ends, the magnetic circuit being fixed inside the sleeve between the first and second tubular ends such that the magnetic circuit is able to withstand magnetic torques generated in the air gap during operation, wherein at least one loop of the winding head is coated, in continuity with pieces of the magnetic circuit, in a block of potting resin, which extends radially outside as far as a corresponding tubular end wall, wherein the reinforcing piece is interposed between an internal wall of the first tubular end and a portion of the block of potting resin originating out of the end face of the first terminal part surrounding a region of the winding head in which the conductors follow a looped path in the block of potting resin, wherein the wedge wedges the reinforcing piece in position to prevent the reinforcing piece from protruding axially internally on the internal wall with respect to the region of the winding head so as to leave a determined annular sector of the internal wall in direct adhering contact with the block of potting resin, and wherein the magnetic circuit includes a first stack of laminations with radial arms or teeth separated by openings, which form the slots, and a second stack of pieces shaped as a circular ring forming a cylindrical casing inside which, under conditions of magnetic continuity and blocked in terms of rotation, the first stack is mounted, and wherein the block of potting resin establishes a mechanical reinforcing connection between at least the end face of the first terminal part corresponding to the first stack and the annular section in the internal wall of the first tubular end.

* * * * *